Nov. 12, 1946.   L. C. STOWELL   2,410,907
TENTER CHAIN LINK
Filed Sept. 29, 1944
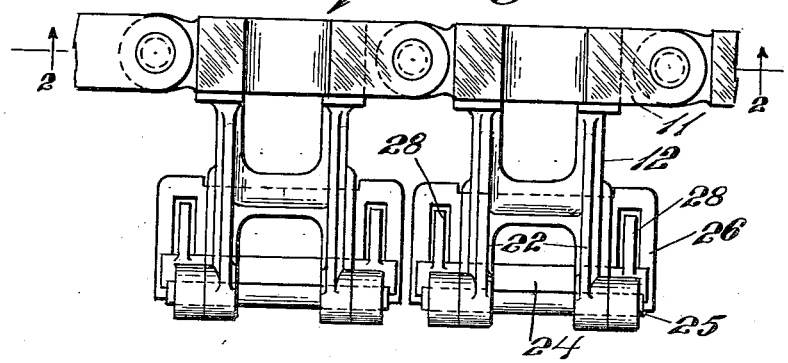
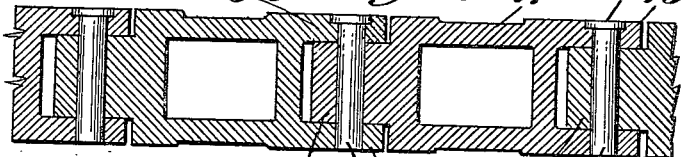
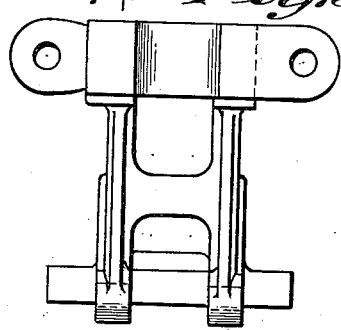
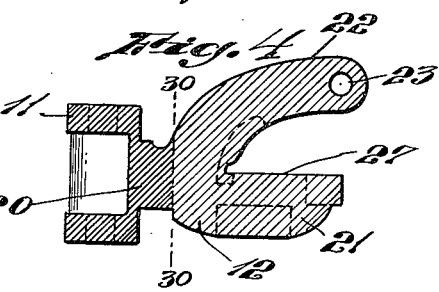
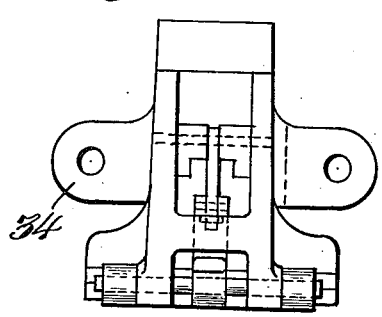
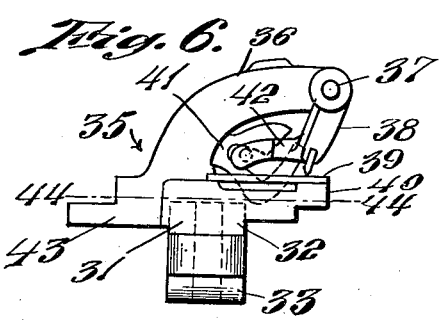
INVENTOR
Lyman C. Stowell
BY Barlow & Barlow
ATTORNEYS Patented Nov. 12, 1946

2,410,907

UNITED STATES PATENT OFFICE 2,410,907

TENTER CHAIN LINK

Lyman Charles Stowell, Oaklawn, R. I.

Application September 29, 1944, Serial No. 556,381

3 Claims. (Cl. 26—62)

This invention relates to a tenter chain such as is used in the finishing of textile fabrics.

The travelling chains on a tenter frame which grip and hold the fabric out in web form are subjected to a treatment which is hard on the tenter chains and accordingly tenter chains wear out rapidly. These chains run through a caustic mercerizing solution and cannot be lubricated by the usual grease or oil which is used for lubricating contacting metal surfaces where wear will occur. The tenter links are usually flexibly connected together by rivet pins extending through them and hardened bushings are inserted in the links, so as to better withstand the wear due to the flexing of one link relative to another. The links of the chain are also guided along tracks of the frame which subject this portion of the links to additional wear. No lubricant can be provided along these parts.

The opening and closing of the gate of the gripping portion of a link also subject this portion to wear and the over-arms which support the gate frequently have to be adjusted by bending these arms to compensate for the grinding of the plate against which the gate portion of the link contacts. This requires a soft stock such as malleable iron in order that this may be accomplished.

One of the objects of this invention is to provide a tenter link which will last much longer than tenter links which are now utilized.

Another object of this invention is to provide a tenter link which may be of various forms but which will have that portion where wear occurs hardened to withstand the wear.

Another of the objects of this invention is to provide chains in which the links will have their over-arms of such a character that they may be adjusted by bending as heretofore, but which will also be of such a character that the wearing or frictioning parts of the link will be harder than heretofore and will better withstand wear.

A more specific object of this invention is to harden a portion of the tenter link along that portion which forms the chain while leaving the work gripping portion of a softer material.

Another object of this invention is to provide a link in which bushings will be unnecessary.

With these and other objects in view, the invention consists of certain novel features of construction, as will be more fully described and particularly pointed out in the appended claims.

In the accompanying drawing:

Fig. 1 is a top plan view of a tenter chain formed in accordance with this invention;

Fig. 2 is a sectional view on substantially line 2—2 of Fig. 1;

Fig. 3 is a top plan view of one of the links alone with the gate removed;

Fig. 4 is a section on substantially line 4—4 of Fig. 3;

Fig. 5 is a top plan view of a modified form of tenter link;

Fig. 6 is an end view of the modified form shown in Fig. 5.

In proceeding with this invention a tenter link is formed similarly to that heretofore provided except that instead of providing for bushings for the connecting pins the bushings are omitted and that body portion of the link which forms the connected series is hardened while leaving the overhanging arms and body portion of the link beneath them of a softer material so that these arms may be bent or adjusted as desired.

With reference to the drawing, Fig. 1 shows a portion of a series of links of a chain with each link designated generally 10, which comprises a so-called chain portion 11 and a work engaging portion 12.

The chain portion 11 has bifurcated arms 13 and 14 at one end and a tongue 15 at the opposite end to extend between the arms 13 and 14. Registering holes extend through the arms and tongue for the reception of a pivot pin 16 which is headed at one end as at 17 to be received in a recess in the arm 13. This pin is forced into the arms 13 and 14 and is held by friction in position.

The work engaging portion 12 is connected to the chain portion 11 by a neck 20 (see Fig. 4) and this work engaging portion comprises a lower jaw 21 and an overhanging arm 22 having an opening 23 therein for the support of a gate or movable jaw 24 which rocks upon the pivot pin 25 which extends between the two overhanging arms 22 of each link. A ground face plate 26 rests upon the upper surface 27 of each jaw 21 against which the movable gate or jaw 24 contacts. Suitable controls 28 are carried by the movable jaw for directing the movement of the jaw with reference to the fabric which it engages.

A tenter link body of this shape is usually all formed of a single casting such as shown by the shaded portion in Fig. 4, this body usually being of malleable iron and soft enough so that the overarm 22 may be bent to be set with reference to jaw 21. I harden that portion of the jaw 11 which is connected in the chain, and which is at the left of the line 30 in Fig. 4, so that this portion which receives the pin and is guided along the frame of the machine will be several points harder than the remainder of the body, such for instance as five points. By this arrangement the wearing portions, which engage the frame and those which rock about the connecting pins are hardened. Thus, I need not utilize hardened bushings as bearings for the pins. At the same time, I leave the overarms bendable for adjustment after the plates 26 are ground so as to compensate for the removal of such stock as is necessary by grinding.

In some cases instead of a chain such as shown in Figs. 1 to 4 I may employ a chain made of links such as shown in Figs. 5 and 6. In this case the work-engaging portion is directly over the chain portion instead of at one side thereof. In this form of link the chain portion of the body 31 has a pair of arms 32 and 33 at one end with a tongue portion 34 at the other end to extend between the arms 32 and 33. Registering openings are provided through the tongues and arms for the reception of a connecting pin such as heretofore described. The overhanging portion of the link for engaging the work is designated generally 35 and employs an overarm 36 which serves to pivotally mount on a rod 37 a gate 38 to engage the plate 39 which is supported on this lower jaw 40 of this portion of the link. A control tongue 41 engages inwardly extending portion 42 of the gate for engaging the fabric and in turn controlling the dropping of gate at the proper time.

In this form of link, chain portions 32, 33, and 34 are all hardened and the lower body portion 43 is also hardened up to a line 44, 44 extending substantially horizontally across the link.

By the above arrangement it will be apparent that no bushings are required and that the parts of the link which contact other parts to rub against them are all of hardened material. The chain is found to outlast the old form of link several times and still the overarms may be adjusted for the grinding of the plate which wears due to the chattering of the gate or movable gripping jaw which contacts it many times in operation.

I claim:

1. A tenter link comprising a lower body portion having integral spaced arms at one end and tongue at the other end to extend into the space between the arms of an adjacent link to provide a chain and a clip superimposed on said body and of the same piece of material as the body and having an overhanging arm to pivotally mount a gripping jaw, said body having its lower portion hardened to a height above said arms and tongue to provide a hard wearing surface for the chain portion of said link while leaving the overhanging arm bendable for adjustment.

2. A tenter link as set forth in claim 1 wherein said body has a fixed jaw and said hardening extends to a point just below the fixed jaw of said body.

3. A tenter link as set forth in claim 1 wherein said body has a fixed jaw and said hardening extends to a point just below the fixed jaw of said body and a hardened plate is mounted on said fixed jaw.

LYMAN CHARLES STOWELL.